3,051,726
GLYCOLIC ACID ESTERS OF N-SUBSTITUTED-2-PYRROLIDYLCARBINOLS
John H. Biel, Milwaukee, Wis., assignor to Lakeside Laboratories, Inc., Milwaukee, Wis., a corporation of Delaware
No Drawing. Filed Sept. 15, 1959, Ser. No. 840,015
3 Claims. (Cl. 260—326.3)

This invention relates to novel chemical compounds and processes of preparing the same. More particularly, this invention is concerned with novel pyrrolidine derivatives having pharmacological activity.

According to the present invention there are provided novel pyrrolidine derivatives of the formula

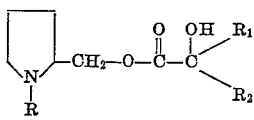

and acid addition, and quaternary ammonium salts thereof, wherein R is a lower alkyl group such as methyl, ethyl, propyl, butyl and pentyl and aralkyl groups such as the phenyl-methyl, phenyl-ethyl and phenyl-propyl groups, $R_1$ is a member of the group consisting of the phenyl, 2-thienyl, cyclohexyl and cyclopentyl groups, and $R_2$ is a member of the group consisting of the 2-thienyl, cyclohexyl and cyclopentyl groups.

Such compounds are readily prepared by reacting an N-lower alkyl or aralkyl-2-pyrrolidylmethylcarbinol with an appropriate di-cyclic glycolate in the presence of sodium or a metal alcoholate. This process can be represented as follows:

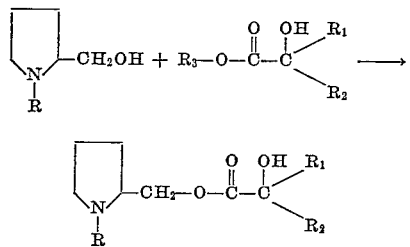

wherein R, $R_1$ and $R_2$ have the significance previously assigned and $R_3$ is a hydrocarbon group and particularly a lower alkyl group.

Some of the N-lower alkyl or aralkyl-2-pyrrolidylmethylcarbinols which can be used in the process are such compounds in which the nitrogen substituent is methyl, ethyl, propyl, butyl, pentyl, benzyl and phenethyl.

Representative of the di-cyclic glycolates which can be used are the esters of phenylcylohexyl glycolic acid, phenylcyclopentyl glycolic acid, phenyl 2-thienyl glycolic acid and dicyclohexyl glycolic acid. Lower alkyl esters such as the methyl and ethyl esters are advisably employed in the reaction.

The reaction is conveniently effected by contacting the reactants in the presence of a suitable inert organic solvent, and advisably one which has a boiling point above that of the alcohol formed as a by-product in the reaction. This permits reflux of the reaction mixture and separation of the more volatile alcohol which facilitates bringing the reaction to completion. The preferred solvent is n-heptane. Sodium or a metal alcoholate such as sodium methoxide or sodium ethoxide is included to promote the reaction. After the reaction is essentially completed the reaction mixture is filtered, washed with water, dried, and the solvent removed by distillation in vacuo. Care should be taken to avoid heating the product much beyond about 100° C. since rearrangement to the ring-expanded N-lower alkyl or aralkyl-3-piperidyl di-cyclic glycolate occurs at elevated temperatures.

Some of the products which are produced in this way are N-ethyl-2-pyrrolidylmethyl phenylcyclopentylglycolate, N-methyl-2-pyrrolidylmethyl phenylcyclohexylglycolate, N-benzyl-2-pyrrolidylmethyl phenyl 2-thienyl glycolate, N-ethyl-2-pyrrolidylmethyl dicyclohexylglycolate and N-methyl-2-pyrrolidylmethyl dicyclopentylglycolate.

Acid addition salts such as the hydrochloride, hydrobromide, sulfate, phosphate, maleate, acetate, citrate, succinate and tartrate of the bases are readily formed by conventional methods. In addition, quaternary ammonium salts, such as the methyl chloride, methyl bromide, ethyl chloride, benzyl chloride, methyl sulfate, methyl paratoluenesulfonate and the like, can be formed of the bases.

The free bases and the salts thereof have useful pharmacological properties. Thus, they have high antispasmodic activity when administered as the base or as a nontoxic salt thereof. In the isolated guinea pig ileum test, these compounds have about two to ten times the potency of atropine. The acid addition salts also produce powerful central stimulant effects in animals, which is a property that the quaternary salts do not have. The acid addition salts thus might be used in the treatment of mental depression by virtue of this central stimulant activity.

The compound presently considered to be of most interest within the group is N-ethyl-2-pyrrolidylmethyl phenylcyclopentylglycolate. This compound, as the hydrochloride, caused central stimulant effects which were not equaled by atropine at twenty times the effective dose.

The compounds of this invention are conveniently administered in therapeutic unit dosages such as tablets, capsules, elixirs, powders and aqueous solutions. The size of the dose for an individual will depend upon the particular compound used and the therapeutic effect desired. Generally, however, from 0.3 to 30 mgm. of the compound is included in a unit dosage.

For a more complete understanding of this invention reference will now be made to a specific procedure for preparing the herein claimed compounds.

EXAMPLE 1

N-Ethyl-2-Pyrrolidylmethyl Phenylcyclopentyl-Glycolate Hydrochloride

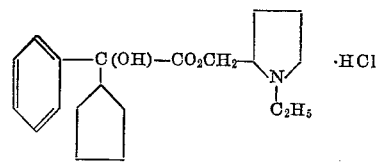

A mixture consisting of 10.6 g. (0.08 mole) N-ethyl-2-pyrrolidylmethanol, 19.3 g. (0.08 mole) of methyl phenylcyclopentylglycolate, 1.0 g. of sodium methoxide and 200 cc. of n-heptane was refluxed for four hours, while methanol was separated in a Dean-Stark water separator. The catalyst was removed by filtration and the filtrate washed three times with 100 cc. of water. The organic phase was separated and dried with magnesium sulfate. The solvent was removed by distillation in vacuo. (Care should be taken not to heat the residue beyond 100° C. since rearrangement to the ring expended N-ethyl-3-piperidyl phenylcyclopentylglycolate occurs at elevated temperatures.)

The residual base was dissolved in 300 cc. of ether and converted to the hydrochloride salt with ethereal hydrochloric acid and the solid isolated by filtration, yield 21.3 g. (84%), M.P. 170–172° C. It was recrystallized from acetonitrile, yield 14 g., M.P. 185–186° C.

*Anal.*—Calcd. for $C_{20}H_{30}ClNO_3$: Cl, 9.66; N, 3.81. Found: Cl, 9.77; N, 3.83.

Various changes and modifications of the invention can be made and, to the extent that such variations incorporate the spirit of this invention, they are intended to be included within the scope of the appended claims.

What is claimed is:

1. N-lower alkyl-2-pyrrolidylmethy phenylcyclopentylglycolate.
2. N-ethyl-2-pyrrolidylmethyl phenylcyclopentylglycolate.
3. N-ethyl-2-pyrrolidylmethyl phenylcyclopentylglycolate hydrochloride.

References Cited in the file of this patent

UNITED STATES PATENTS

| | | |
|---|---|---|
| 2,695,301 | Blicke | Nov. 23, 1954 |
| 2,844,591 | Feldkamp et al. | July 22, 1958 |
| 2,928,843 | Mehta et al. | Mar. 15, 1960 |

FOREIGN PATENTS

| | | |
|---|---|---|
| 159,630 | Sweden | July 16, 1957 |
| 483,258 | Great Britain | Apr. 14, 1938 |
| 558,653 | Great Britain | Jan. 14, 1944 |
| 765,607 | Great Britain | Jan. 9, 1957 |
| 788,126 | Great Britain | Dec. 23, 1957 |

OTHER REFERENCES

Biel et al.: J. Am. Chem. Soc., vol 77, pages 2250–2256 (1955).

UNITED STATES PATENT OFFICE
CERTIFICATE OF CORRECTION

Patent No. 3,051,726                                                August 28, 1962

John H. Biel

It is hereby certified that error appears in the above numbered patent requiring correction and that the said Letters Patent should read as corrected below.

Column 2, line 68, for "expended" read -- expanded --; column 3, line 11, for "-pyrrolidylmethy" read -- -pyrrolidylmethyl --.

Signed and sealed this 27th day of November 1962.

(SEAL)
Attest:
ESTON G. JOHNSON
Attesting Officer

DAVID L. LADD
Commissioner of Patents